United States Patent [19]

Nakagawa

[11] Patent Number: 4,584,602

[45] Date of Patent: Apr. 22, 1986

[54] POLLING SYSTEM AND METHOD USING NONDEDICATED TELEPHONE LINES

[75] Inventor: Akira Nakagawa, Saitama, Japan

[73] Assignee: Pioneer Ansafone Manufacturing Corporation, Saitama, Japan

[21] Appl. No.: 549,519

[22] Filed: Nov. 7, 1983

[30] Foreign Application Priority Data

| Nov. 8, 1982 | [JP] | Japan | 57-195715 |
| Dec. 10, 1982 | [JP] | Japan | 57-216586 |
| Dec. 10, 1982 | [JP] | Japan | 57-216587 |
| Dec. 10, 1982 | [JP] | Japan | 57-216588 |

[51] Int. Cl.⁴ .................. H04N 17/00; H04M 11/00
[52] U.S. Cl. .................. 358/84; 179/2 AM
[58] Field of Search ........... 179/2 AM, 2 AS; 358/84; 455/2, 5

[56] References Cited

U.S. PATENT DOCUMENTS

| 3,769,579 | 10/1973 | Harney | 358/84 |
| 4,104,486 | 8/1978 | Martin et al. | 179/2 AM |
| 4,225,884 | 9/1980 | Block et al. | 358/84 X |
| 4,241,237 | 12/1980 | Paraskevakos et al. | 179/2 AM |
| 4,258,386 | 3/1981 | Cheung | 179/2 AS X |
| 4,347,604 | 8/1982 | Saito et al. | 358/84 X |
| 4,361,851 | 11/1982 | Asip et al. | 358/84 |
| 4,371,751 | 2/1983 | Hilligoss, Jr. et al. | |

FOREIGN PATENT DOCUMENTS 1523753 9/1978 United Kingdom .................. 358/84

Primary Examiner—Keith E. George
Attorney, Agent, or Firm—Sughrue, Mion, Zinn, Macpeak and Seas

[57] ABSTRACT

An audience data rating collecting system and method which are capable of collecting television audience rating data automatically within a short period of time. A broadcasting station transmits over the air a marker signal. The marker signal is received by terminal units associated with selected subscribers' television receivers. Upon reception of the market signal, and after waiting a period of time necessary for other terminal units within the system to transmit their data back to the station, each terminal unit automatically dials a predetermined telephone number at the broadcasting station. Once the broadcasting station has had time to automatically answer, data from that terminal unit representative of the channel then being viewed is transmitted over the telephone circuit to the broadcasting station. After all terminal units have called in, the results are tabulated.

18 Claims, 3 Drawing Figures

POLLING SYSTEM AND METHOD USING NONDEDICATED TELEPHONE LINES

BACKGROUND OF THE INVENTION

The present invention relates to a collector of audience data in television broadcasting.

Heretofore, audience ratings have been compiled by solicitors who telephone, visit or send questionnaires to selected households by mail asking the identity of programs they watch at particular times. However, it is impossible through such methods to collect data quickly and to obtain an audience rating on an instantaneous basis. Moreover, although cable television systems and the like make possible the instantaneous collection of data, collecting audience ratings with such systems is expensive and it is not feasible to collect data from a wide area.

An object of the present invention, which has been made in the light of the above described problems is to provide an apparatus capable of collecting instantaneously audience rating data from a wide area.

SUMMARY OF THE INVENTION

In accordance with the above and other objects of the invention, the invention provides a data collecting system and method in which a broadcasting station broadcasts a marker signal simultaneously to a plurality of terminal units located in preassigned subscribers' homes. The terminal units in the subscribers' homes then transmit back to the broadcasting station, over a telephone circuit, data identifying the program then being viewed. This is done in sequential order, with the sequential transmission being effected by providing a timing operation in each terminal unit which counts out a time period equal to that needed for the terminal units higher in sequence to complete their data transmitting operations. When each terminal unit is to perform a transmitting operation, a telephone ordinarily connected to the telephone circuit utilized by the terminal unit is temporarily disabled.

DESCRIPTION OF THE PREFERRED EMBODIMENTS

Figure 1:
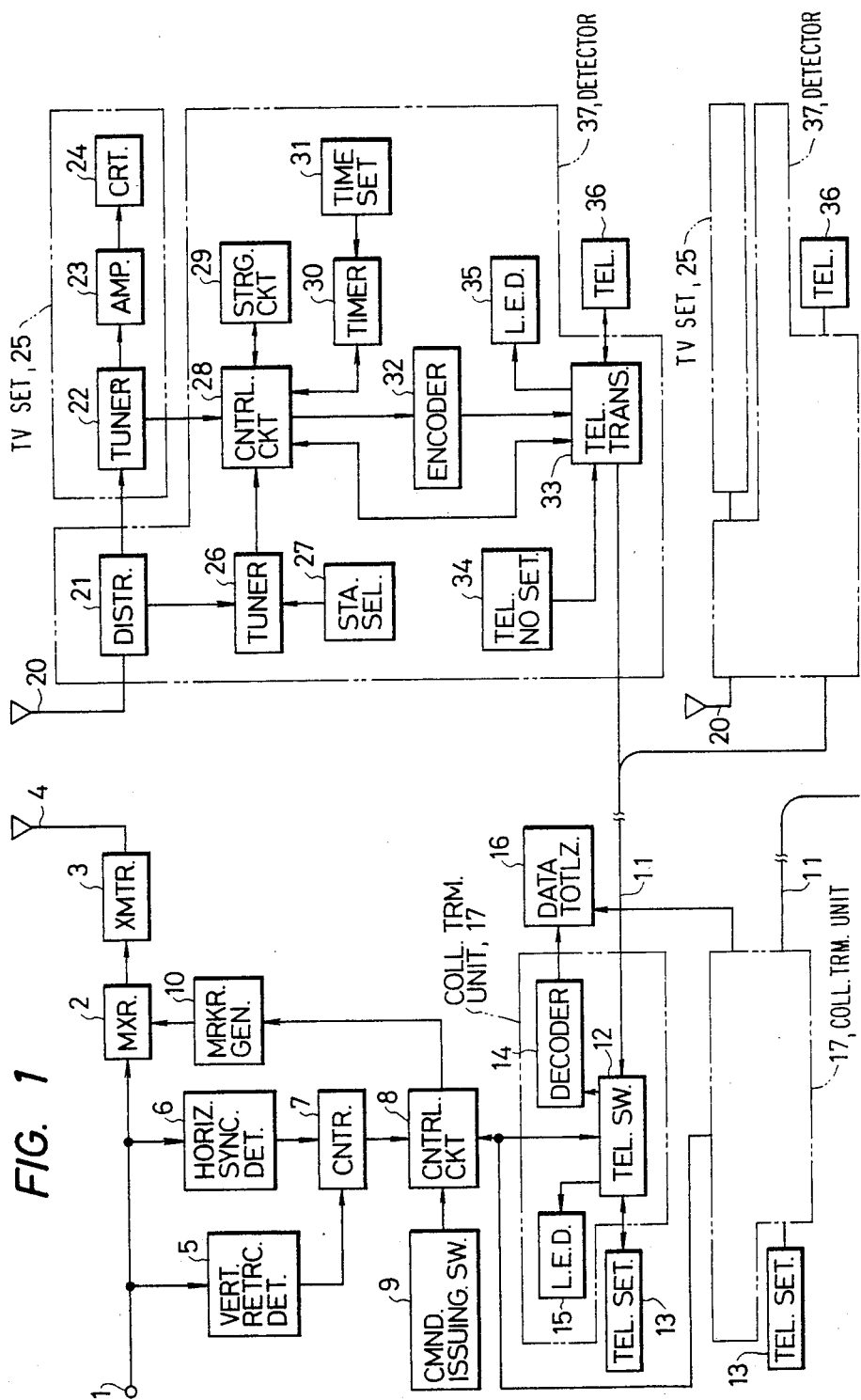
FIG. 1 is a block diagram illustrating a data collection system of the invention.

Referring now to the drawings, an exemplary embodiment of the present invention will be described.

FIG. 1 is a block diagram of an audience data collection system of the present invention. In this drawing, an apparatus at the broadcasting station and one in a viewer's home are shown on the left-hand and right-hand sides, respectively. A video signal applied from an input terminal 1 is supplied to a transmitter 3 through a mixer 2 and then broadcast by an antenna 4 upon the station's preassigned channel. The video signal is also inputted to a vertical retrace interval detection circuit 5 and to a horizontal synchronizing signal detection circuit 6 with which the vertical retrace interval and the horizontal synchronizing signal are detected. A counter 7 is operated to count the pulses of the horizontal synchronizing signal after the start of the vertical retrace interval has been detected. An output pulse is applied from the counter 7 to a control circuit 8 when it has counted a preset number.

Reference numeral 11 indicates a telephone circuit which is selectively connected to a telephone 13 or a decoder 14 through an automatic telephone switch device 12. Reference numeral 15 designates a display device such as a light-emitting element which lights when an output is generated by the control circuit 8 and the circuit 11 is switched over by the switch device 12 to operate a decoder 14. A data totalizer 16 totals the data applied thereto by the decoder 14. A plurality of collector terminal units 17 are provided in correspondence with the number of telephones 13 (with different telephone numbers) at the broadcasting station. Each collector terminal unit includes an automatic telephone switch device 12, decoder 14 and display device 15.

A television receiving antenna 20 provided at each home is connected through a distributor 21 to a television set 25, the latter including a tuner 22, an amplifier 23, and a CRT 24. The output of the antenna 20 distributed by the distributor 21 is also supplied to a tuner 26. With the tuner 22, the viewer can select any broadcasting station. Although the ordinary function of the tuner 26 is to enable selection of a broadcasting station by means of a station selection control 27, in the invention the tuner 26 is fixed so as to prevent the viewer from changing the station.

Reference numeral 28 indicates a control circuit which is used to cause a storage circuit 29 to store an indication of which broadcasting station is being received by the tuner 22 when an output pulse is produced by the tuner 26. A timer circuit 30 generates an output pulse when the time set by a setting device 31 has elapsed since the last pulse on the output of the tuner 26 was produced. An encoder 32 is provided to encode the data related to the broadcasting station and stored in the storage circuit 29 in the form of a digital signal. The output of the encoder 32 is transmitted to the telephone circuit 11 through an automatic telephone transmitter 33. Reference numeral 34 indicates a telephone number setting device for setting the number of the telephone 13 to which the transmitter 34 should transmit a message. A display 35 is arranged to light when the control circuit 28 switches the connection of the transmitter 33 from a telephone 36 to the encoder 32. A detector 37, including a distributor 21, tuner 26, station selection control 27, control circuit 28, storage circuit 29, timer 30, setting device 31, encoder 32, transmitter 33, number setting device 34 and display 35 is provided for each home in the system. The number setting devices 34 are programmed so that a plurality, for instance 30, homes transmit messages to each of the collector terminal units 17 at the broadcasting station.

Figure 2:
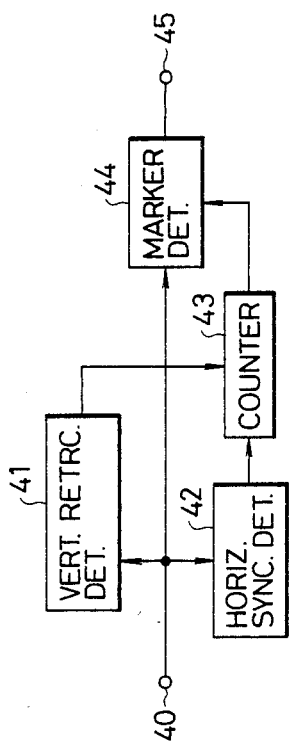
FIG. 2 is a block diagram of a marker signal detecting circuit.

FIG. 2 is a block diagram of a circuit in the tuner 26 used to detect the marker signal. A video signal inputted from a terminal 40 is supplied to a vertical retrace interval detection circuit 41 and a horizontal sychronizing signal detection circuit 42 with which the vertical retrace interval and the horizontal synchronizing signal are detected. A counter 43, when the vertical retrace interval is detected, counts the number of horizontal synchronizing pulses received and generates an output pulse upon reaching a preset value. The preset value conforms to that of the counter 7 at the broadcasting station. Accordingly, when the counter 43 generates an output, a marker detection circuit 44 is activated to detect when the recorded video signal contains a marker signal and generates an output when the presence of the marker signal is detected.

Figure 3:
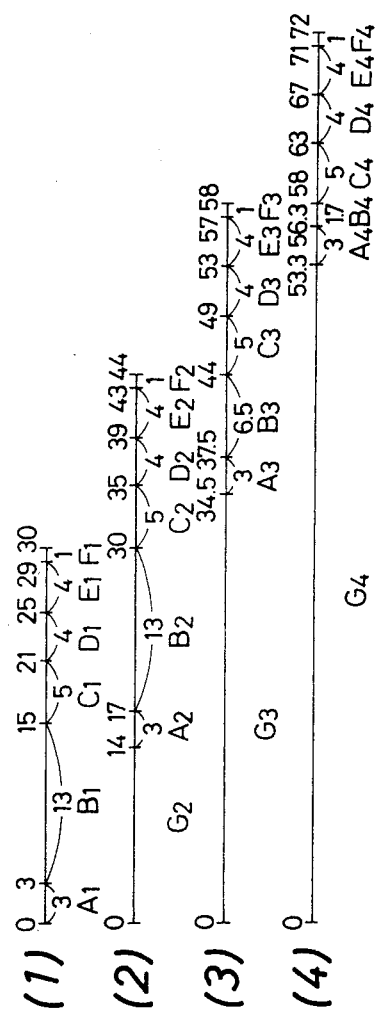
FIG. 3 is a timing chart indicating the functions of an automatic telephone transmitter.

FIG. 3 indicates the times set by the time setting devices 31 for the detectors 37 corresponding to one of the terminals 17 at the broadcasting station. Assuming that the telephone number of the telephone 13 corresponding to the terminal 17 is 03-900-0000, since data is sequentially sent to that number from, for instance, 30 homes (detectors 37), the time set in the detectors 37 is determined as follows. The period Ai in FIG. 3 is used for confirming the presence of a dial tone when the transmitter 33 calls the receiver 12, and requires a minimum of three seconds. The period Bi is used for sending dial pulses. Since the number to be dialed has seven 0s, three 1s, one 9 and eight intervals between digits, the total time required in the case of a 10 PPS telephone is 13 seconds [0.1×(10×7+3+9)+0.6×8], half of the above time (6.5 seconds) in the case of a 20 PPS type telephone, and 1.7 seconds (0.1×9+0.1×8) in the case of a push-button type telephone. The period Ci relates to the time after the completion of the transmission of the dial pulses until the called number is rung, five seconds. The period Di is required for the automatic telephone receiver 12 to detect the ringing signal, and is about four seconds. The period Ei is required to send out the data, and is about four seconds. The period Fi is provided as a buffer to ensure that the circuits on both the transmitting and receiving sides are opened, and is one second. The period Gi is an access time needed before the automatic telephone transmitter 33 starts its transmitting operation after the marker signal has been detected, and is given by the following equation:

$$Gi = (A1 + B1) + (i-1)(C + D + E + F) - (Ai + Bi).$$

Thus, assuming that the telephone 36 which should be operated first is a 10 PPS type, 30 seconds are required until the circuit is opened after the marker signal has been detected and the data sent out. Assuming that the telephone 36 which should be secondly operated is also a 10 PPS type, because 16 seconds are required until the completion of the transmission of the dial pulses from the telephone 36, the timer circuit 30 is set at 14 seconds (G2=14 seconds) by the setting device 31. Assuming that the telephone 36 which should be thirdly operated is a 20 PPS type, its timer circuit 30 is set at 34.5 seconds (G3=34.5 seconds). Assuming that the telephone 36 which should be fourthly operated is a push-button type, the timer circuit 30 is set at 53.3 seconds (G4=53.3 seconds). The timer circuit 30 in the detector 37 of each of the 30 households associated with the terminal unit 17 is successively set in the same way. In so doing, immediately after the data of the i-th detector 37 has been transmitted and the circuit has been opened, the (i+1)th detector 37 is operated so that the desired audience data can be transmitted and collected.

The same time setting procedure is applied to the detectors 37 of other groups corresponding to the other terminals 17.

Assuming that channel (broadcasting station) 8 wishes to obtain an audience rating of its program, the station will have to poll the designated number of homes to determine the setting of the detectors 37. Accordingly, either prior to or during installation of the detector 37 the station selection control 27 is set to the channel 8 to cause the tuner 26 to respond only to channel 8. The telephone number setting device 34 is used to set the numbers of the subscribers so as to associate 30 of those subscribers with one of the numbers of the terminals 17 at the broadcasting station, whereas the time setting device 31 is used to set the order of data transmission of the 30 subscribers, taking into consideration the set number and the type of the telephone in each household.

The channel 8 station operates the command issuing switch 9 at the commencement of the survey. When the command issuing switch 9 is operated, a marker signal, for instance, a white flag, is inserted into the luminous signal portion of a predetermined scan line during its horizontal synchronizing interval. Then, the control circuit 8 generates an output to the receiver 12 of each terminal 17 and changes the connection of the circuit 11 from the telephone 13 to the decoder 14. Then the display device 15 is lit, indicating that the telephone 13 is unusable.

Accordingly, when the receiver 12 detects the arrival of a calling signal, it operates to supply the data signal transmitted from the circuit 11 to the decoder 14. Also, the marker signal is detected by the tuner 26 having the detection circuit shown in FIG. 2. The control circuit 28 causes the storage circuit 29 to store the channel number then being received through the tuner 22 when the marker signal is detected. Then, the control circuit 28 further provides an output to the timer circuit 30 to cause the timing operation set by the setting means 31 to start, and also an output to the transmitter 33 to change the connection of the circuit 11 from the telephone 36 to the encoder 32, and further causes the display 35 to light to indicate that the telephone 36 is not usable. Otherwise, it is possible to change over the transmitter 33 when the timer 30 generates an output after it has performed a timing operation for a preset period of time when starting the calling operation.

If the telephone 36 is being used when changing over the transmitter 33, data transmission is suspended without forcing the transmitter to change over, or data transmission may be restarted after data transmission from the other subscribers has been completed. At the time the timer circuit 30 is to be operated, the control circuit 28 operates the telephone transmitter 33 to cause it to start transmission to the number set by the telphone number setting device 34. As described with reference to FIG. 3, because the circuit of the receiver 12 is opened at the point of time the transmitter 33 has completed the transmission of dial pulses, the line is prevented from immediate outside use.

The data stored in the storage circuit 29 is then encoded by the encoder 32 and sent to the broadcasting station through the circuit 11. At the broadcasting station, the data is demodulated by the decoder 14 and then totaled by the data totalizer 16, which may be a computer. The control circuit 28 operates to count the number of data bits sent out by the transmitter 33 and to release the transmitter 33 from the circuit 11 immediately upon the preset number of bits being counted, that is, when the termination of data transmission has been detected. In the same manner, the control circuit 8 counts the number of data bits received by the receiver 12 and releases the receiver 12 from the circuit 11 immediately upon the preset number of bits being counted. The above-described operation is carried out in each terminal 17.

It is to be noted that a dedicated data totalizer 16 may be provided for each terminal 17, or a single totalizer provided for the whole system.

Compilation of audience ratings has been referred to in the above exemplary embodiment of the present invention, but the invention is also applicable to other applications, for instance, the reading of electricity, gas or water meters.

As described above, the present invention employs a broadcast signal to transmit a marker signal. A receiver for receiving the marker signal is provided in each subscriber's home which stores data indicating the program or channel being viewed when the marker signal is received. The stored data is then transmitted by means of an ordinary telephone circuit to thus provide instant totalization of viewing data. In addition, other types of data can be collected. In any case, the data can be collected quickly and at a low cost.

I claim:

1. A data collecting system comprising a plurality of receiving stations, each receiving station including: a tuner connected to an antenna; memory means for temporarily storing data supplied from an apparatus being used when said tuner receives a marker signal; timing means for performing a timing operation when said marker signal is received; means for variably setting a timing period of said timing means; means for automatically effecting a telephone call after said timing period set by said setting means has elapsed, said means for automatically effecting a telephone call including an automatic transmitter in each receiving station and means for causing a i-th automatic telephone transmitter at a corresponding i-th one of said plurality of receiving stations to commence a telephone call, in accordance with said timing period, at an i-th time beginning a predetermined period before an (i−1)th automatic telephone transmitter at a corresponding (i−1)th one of said plurality of receiving stations terminates data transmission to a central station and releases a telephone circuit, whereby a call signal from said i-th one of said automatic telephone transmitters arrives at said central station immediately after said (i−1)th automatic telephone transmitter releases said telephone circuit; means for setting a telephone number of said central station to be called by said means for automatically effecting a telephone call; an encoder for encoding data stored by said memory means; and means for sending out said data to said central station through a telephone circuit.

2. The data collecting system as claimed in claim 1, wherein said tuner is fixed to always be tuned to a predetermined station.

3. The data collecting system as claimed in claim 1, wherein said apparatus comprises a television receiver and said data corresponds to a channel being viewed on said television receiver.

4. The data collecting system as claimed in claim 1, wherein said means for automatically effecting a telephone call comprises means for rendering unusable a telephone connected to said telephone circuit while said telephone call effecting means is effecting a telephone call.

5. The data collecting system as claimed in claim 1, further comprising means for detecting a terminating point of sending out of said data; and wherein said means for automatically effecting a telephone call operates to release said telephone circuit immediately upon detection of said terminating point of said data, independently of said central station.

6. The data collecting system as claimed in claim 1, wherein said means for automatically effecting a telephone call comprises means for inhibiting a calling operation by said means for automatically effecting a telephone call when a telephone connected to said telephone circuit is being used.

7. A data collecting system as claimed in claim 1, wherein said predetermined period is determined by taking into consideration at least one of a period A for confirming the presence of a dial tone at said i-th one of said automatic telephone transmitters and a period B for sending a plurality of dial pulses.

8. A data collecting system as claimed in claim 7, wherein a delay time interval G for an i-th one of said automatic telephone transmitters to wait after said marker signal before initiating a telephone call is determined in accordance with a time period needed for ones of said automatic telephone transmitters in sequence to complete transmitting operations, including said period A, said period B, a time C for waiting for a call to start to ring at said automatic telephone receiver, a time D for said automatic telephone receiver to answer the call once the call has started to ring, a period E for transmitting data, and a period F for allowing for release of said telephone circuit.

9. A method of collecting data from a plurality of terminal units, comprising the steps of: providing a single automatic telephone receiver, at a central station, and a plurality of automatic telephone transmitters in a telephone circuit, each of said automatic telephone transmitters including means for storing data; simultaneously transmitting a marker signal at a first time to all of said automatic telephone transmitters over a broadcasting channel; transmitting via said telephone circuit the data stored in each of said terminal units to said single automatic telephone receiver in a predetermined sequence, each of said automatic telephone transmitters transmitting data to said single automatic telephone receiver at a respective delay time after said first time and thereafter releasing said telephone circuit, with an i-th one of said automatic telephone transmitters starting a calling operation a predetermined period before an (i−1)th one of said automatic telephone transmitters has released said telephone circuit, such that data from said i-th one of said automatic telephone transmitters arrives at said single automatic telephone receiver immediately after said (i−1)th one of said automatic telephone transmitters has released said telephone circuit.

10. The data collecting method as claimed in claim 9, wherein said step of transmitting in sequence comprises, at each of said automatic telephone transmitters, performing a timing operation commencing from reception of said marker signal, each of said automatic telephone transmitters performing said timing operation for a different time period corresponding to said respective delay time; and automatically dialing said telephone receiver only after said timing operation has been completed.

11. A data collecting method as claimed in claim 9, wherein said predetermined period is determined by taking into consideration at least one of a period A for confirming the presence of a dial tone of said i-th one of said automatic telephone transmitters and a period B for sending a plurality of dial pulses.

12. The data collecting method as claimed in claim 11, wherein a delay time interval G for an i-th one of said automatic telephone transmitters to wait after said first time before initiating a telephone call is determined in accordance with a time period needed for ones of said automatic telephone transmitters in sequence to complete transmitting operations, including said period A, said period B, a time C for waiting for a call to start to ring at said automatic telephone receiver, a time D for said automatic telephone receiver to answer the call once the call has started to ring, and a period F for allowing for release of said telephone circuit.

13. A data collecting method as claimed in claim 12, wherein a delay time Gi for said i-th one of said automatic telephone transmitters is given by the following equation:

$$Gi = (A1+B1) + (i-1)(C+D+E+F) - (Ai+Bi),$$

where

A1 is a period for confirming the presence of a dial tone at a first automatic telephone transmitter;

B1 is a period for said first automatic telephone transmitter to send its dial pulses;

i is a number corresponding to said i-th one of said automatic telephone transmitters;

Ai is a period for confirming the presence of a dial tone at said i-th one of said automatic telephone transmitters; and Bi is a period for said i-th one of said automatic telephone transmitters to send its dial pulses.

14. The data collecting method of claim 13, wherein said data is information indicative of a television channel being viewed on an associated television receiver, said method further comprising the step of assembling said data.

15. The data collecting method of claim 13, further comprising the step of disabling the use of a telephone ordinarily coupled to said telephone circuit during said steps of dialing and transmitting said data.

16. The data collecting method of claim 13, further comprising the step of, at said central station, totaling data received from a plurality of said terminal units.

17. The data collecting method as claimed in claim 13, wherein data transmitted from each of said automatic transmitters contains the same number of bits.

18. The data collecting method as claimed in claim 17, further comprising the step of, at each of said automatic telephone transmitters, terminating transmission upon counting said number of bits.

* * * * *